Patented Jan. 1, 1929.

1,697,264

UNITED STATES PATENT OFFICE.

CARLETON ELLIS, OF MONTCLAIR, NEW JERSEY, ASSIGNOR TO ELLIS-FOSTER COMPANY, A CORPORATION OF NEW JERSEY.

MAKING ORGANIC ACIDS AND OTHER PRODUCTS FROM PETROLEUM.

No Drawing.  Application filed December 24, 1921.  Serial No. 524,697.

This invention relates to a method of oxidizing hydrocarbon oils particularly petroleum hydrocarbons and involves in its more specific aspects the vaporization or cracking of oils and the passage of this hydrocarbon material admixed with air or an oxygen-containing gas through a reaction zone in order to produce oxidized organic compounds.

In order to illustrate the invention I will first describe a particular test which was carried out as follows: The petroleum employed in this instance was ordinary kerosene. It was passed through a cracking tube heated to between 540° and 590° C. approximately. The products from the cracking tube were passed through a trap to remove readily condensable substances and very heavy products and the vapors and fixed gases were passed to a mixing chamber where they were mingled with air. The latter was supplied in the following manner. Air was first passed through a meter under slight pressure into a solution of copper sulphate then into 66° Bé. sulphuric acid and finally into water. In this way clean air having a definite degree of humidity was obtained. The mixture of oil vapors and air were then passed into a catalyzer tube containing fragments of pumice impregnated with vanadium oxide. An amount of oxide equivalent to 10 per cent of vanadium was present on the pumice support. The catalyzer was placed in a U tube of sheet steel, the tube being immersed in a bath of molten lead. The temperature of the latter was held at about 425°–430° C. As uniformity of heating is of importance the lead bath was equipped with a stirrer so that the lead was kept in constant movement. The products issuing from the catalyzer tube were carried through a condenser and then were passed into a scrubbing apparatus containing water. Water soluble compounds including organic acids were dissolved and retained here. The gases and vapors then passed into oil scrubbers and finally to a container in which was placed silica gel. In spite of the fact the vapors passed through several scrubbers containing water or oil the treatment was not sufficient to remove all the fume but the latter was retained by silica gel. It possessed an acid reaction. In the oil scrubbers as well as in the water scrubber a certain amount of oils, gasoline etc. collected and was found to have an acid reaction. The aqueous liquid from the water scrubber was light brown in color and on standing a gummy mass separated. A clear solution was obtained by filtration and this was found to be quite strongly acid. On distillation the temperature rose from 100° to 118° C. A residue of a crystalline nature was found in the flask. The distillate had an acid reaction to litmus. Even that portion distilling at 100° was acid. The distillate between 105° and 118° C. when evaporated afforded a crop of crystals.

The aqueous solution reduces ammoniacal silver nitrate solution but not ordinary silver nitrate solution. The aqueous solution also reduces ammoniacal copper sulphate solution and bleaches potassium permanganate solution. Bromine combines with the organic substance and forms a light yellow precipitate when added to the aqueous solution. Ferric chloride does not produce a violet color. Lead acetate yields an amorphous white precipitate. No precipitate is obtained on adding an alcoholic solution of mercuric chloride to the aqueous material.

On drying the aqueous solution the residue blackens forming a gummy substance. The ether extract of the aqueous solution is a light yellow color but on evaporation at 40° to 50° C. the residue blackens and becomes gummy. This action does not take place so long as some ether remains in the mass and appears to occur as soon as there is free access of air to the residue. The gum which forms is not soluble in ether but is soluble in alcohol.

The aqueous distillate boiling between 105° and 118° C. furnishes a crystalline substance which apparently is similar to the crystalline material referred to contained in the residue on distillation. The crystals are white needles apparently monoclinic and have a melting point 109°–110° C. On melting in the air decomposition takes place but the melting point may be readily determined in a closed tube. The crystals have an acid reaction and are soluble in chloroform, alcohol, ether and water. As noted they are very readily oxidized.

In making the foregoing product the exit gases were found to contain about 5 per cent of carbon dioxide while oxygen was present to the extent of 10 or 11 per cent. Thus the rate of travel of the mixture of oil vapors and air over the catalyzer was such that complete utilization of the oxygen did not take place. In fact the rate of flow was sufficiently fast so that the temperature of the exit gases at the point of departure from the U tube was about 210° C. Under these conditions it was possible to readily obtain the organic acid material having the strong reducing properties noted.

It is also possible to vaporize kerosene without actually cracking the oil and mix it with preheated air so that condensation of the vapors does not occur and pass the mixture through a heated catalyzer in order to bring about oxidation. In this case as in the foregoing example it is possible to have the speed of travel with reference to the temperature of the catalyzer such that free oxygen is obtained in the exit gases.

One phase of my invention involves the treatment of petroleum hydrocarbons with oxygen in this manner so that in the products of oxidation a substantial proportion of oxygen will be present.

In another case light gasoline in fact an extremely light product from Burton pressure stills containing more or less dissolved fixed gases etc. was passed over catalytic material and organic acid products obtained.

By increasing the temperature of the catalytic mass or by reducing the rate of travel of the gas current more extensive oxidation will occur and the oxygen in the exit gases will be correspondingly reduced in amount. Thus it may finally be reduced to zero and further tendencies in this direction will result in the formation of carbon monoxide. If the oxidation takes place in the presence of an excess of oxygen at all times the formation of organic acids is favored. Too protracted exposure to the catalytic mass will result in the formation of excessive amounts of carbon monoxide or carbon dioxide which for the purposes of the present invention constitute a waste of material.

The reaction in the catalytic mass may take place at atmospheric pressures or at pressures 4 or 5 atmosphere above atmospheric or even higher pressures.

A desirable pressure is that obtaining in the pressure stills of the Burton type, for example about 90 pounds, at which pressure the gases may be admixed with air under like pressure and passed over a catalyzer at the requisite velocity. It should be noted that strongly explosive mixtures of gases and oxygen may be obtained which if igniting in the apparatus would be objectionable and it is desirable to produce the mixture of gases immediately before introduction into the catalytic chamber and also to regulate the velocity of the incoming mixture such that in case of ignition the velocity of forward travel will be greater than the rate of backward inflammation.

Various substances may be used for catalytic purposes. While I have mentioned vanadium material I do not wish to be limited to this substance. A mixture of molybdenum and vanadium oxides may be used, or chromates, molybdates etc. For some purposes a heated platinum gauze may be used. A wholly metallic catalyzer, that is a granular material which is metallic throughout, or a metallic carrier coated with active material may sometimes be used to advantage when the generation of heat in the catalytic mass due to the oxidation of combustion is excessive.

The use of more air than is consumed during the passage of the vapors through the catalytic mass constitutes a special phase of the invention to which the present application is not however limited. The temperatures mentioned in the illustration may be varied considerably. For example the fused bath may be heated to between 400 and 500° C. Temperatures of 425 to 450° C. being usually adequate. On the other hand the temperature of the vapors passing through the catalytic mass is governed by several conditions:

1. The temperature of the incoming mixture
2. The temperature of the metal bath
3. Heat conductivity of the catalyzer
4. Rate of travel of the mixture through the catalytic mass
5. Character of the catalyzer
6. Proportion of air
7. The employment of a diluent gas or the addition of steam to retard the reaction or on the other hand the addition of oxygen to air to increase the degree of oxidation
8. Pressure employed
9. The general conditions such as size of the apparatus etc.

Hence the illustration which has been given should be considered merely as one special operation for carrying out the invention to which this application is not limited. While I have described particularly the production of a reducing agent it is to be understood that various organic bodies such as ketones, aldehydes and the like may be produced as well as reducing agents, mono-basic or di-basic organic acids. Further the present application is a continuation-in-part of my copending application Serial No. 284,372, filed Mar. 22, 1919.

The present invention further comprises the production of photographic developers or substances suitable for use in photographic developers by the oxidation of kerosene or other suitable petroleum hydrocarbon. In the illustration above described the crystalline material obtained when rendered neutral or very faintly alkaline has reducing properties adaptable for use in development of photographic plates or films. I therefore lay claim in the present application to the production of a photographic developer or developing agent through the oxidation of kerosene oil.

What I claim is:—

1. The process of oxidizing petroleum which comprises cracking oil under a pressure of 4 or 5 atmospheres removing the heavier products resulting from such cracking and passing the residue of the cracked products admixed with air through a mass of catalytic material supported on a granular carrier, at an oxidizing temperature, passing the products of oxidation through water, oil and silica gel respectively and recovering gasoline, organic acids and other products of oxidation from the scrubbing agents.

2. The process of oxidizing petroleum which comprises cracking oil under super-atmospheric pressure, removing the heavier products resulting from such cracking and passing the residue of the cracked products admixed with air through a mass of catalytic material supported on a granular carrier, at an oxidizing temperature, passing the products of oxidation through water, oil and silica gel respectively and recovering gasoline, organic acids and other products of oxidation from the scrubbing agents.

3. The process of oxidizing petroleum which comprises cracking oil under super-atmospheric pressure, removing the heavier products resulting from such cracking and passing the residue of the cracked products admixed with air through a mass of catalytic material at an oxidizing temperature, passing the products of oxidation through water, oil and silica gel respectively and recovering gasoline, organic acids and other products of oxidation from the absorbing agents.

4. The process of oxidizing cracked kerosene which comprises vaporizing this oil, passing it in admixture with heated air into contact with a porous catalytic mass heated to an oxidizing temperature and extracting crystalline water-soluble organic acids from the products of oxidation.

5. The process of oxidizing a cracked petroleum distillate which comprises vaporizing the distillate, passing it in admixture with air into contact with a porous catalytic mass heated to an oxidizing temperature and extracting water-soluble organic acids from the products of oxidation.

6. The process of oxidizing cracked kerosene which comprises vaporizing this oil and passing it in admixture with heated air into contact with a porous catalytic mass heated to an oxidizing temperature and extracting water-soluble organic acids and other products of oxidation from the effluent gases and vapors.

7. The process of oxidizing kerosene which comprises cracking this oil and passing the cracked products in admixture with air into contact with a porous catalytic mass heated to an oxidizing temperature and extracting crystalline water-soluble organic acids and reducing agents from the products of oxidation.

8. The process which comprises heating a petroleum oil to produce vaporized material, admixing these products with an oxygen-containing gas preheated to a point at which no substantial condensation of the vapors will occur, passing the mixture into contact with a porous catalytic mass heated to an oxidizing temperature and extracting from the products of oxidation organic fatty acids and other products of oxidation.

9. The process which comprises heating kerosene oil to produce vaporized material, admixing these products with an oxygen-containing gas preheated to a point at which no substantial condensation of the vapors will occur, passing the mixture into contact with a porous catalytic mass heated to an oxidizing temperature and extracting from the products of oxidation organic fatty acids and other products of oxidation.

10. The process which comprises heating a petroleum oil to produce vaporized material, admixing these products with an oxygen-containing gas, passing the mixture into contact with a porous catalytic mass containing a compound of vanadium heated to an oxidizing temperature and extracting from the products of oxidation organic fatty acids and other products of oxidation.

11. The process which comprises cracking a petroleum oil to produce vaporized material, admixing these products with an oxygen-containing gas preheated to a point at which no substantial condensation of the vapors will occur, passing the mixture into contact with a porous catalytic mass heated to an oxidizing temperature and extracting from the products of oxidation organic fatty acids and other products of oxidation.

12. The process of treating hydrocarbons which comprises passing a mixture of the hydrocarbon and air over a heated catalyzer and withdrawing the products prior to complete utilization of the oxygen in oxidizing reactions.

13. The process which comprises passing cracked oil and air over a catalyzer at such a rate of speed and at such a temperature that free oxygen is present in substantial amount in the exit gases whereby oxygen-containing organic products are obtained.

14. The process which comprises passing cracked petroleum oil and air over a catalyzer at such a rate of speed and at such a temperature that free oxygen is present in substantial amount in the exit gases whereby oxygen-containing organic products are obtained.

15. The process of treating hydrocarbons which comprises passing an explosive mixture of hydrocarbon vapor and air over a heated catalyzer at a temperature below the ignition point.

16. The process which comprises passing a mixture of cracked petroleum hydrocarbon and air into contact with a catalyzer heated in a bath of molten metal at such a rate of speed that the exit gases are withdrawn at a lower temperature than that of the bath.

17. In the process of oxidizing petroleum hydrocarbons the step of passing a mixture of cracked petroleum vapor and an oxygen-containing gas through a mass of catalyzer maintained at a substantially uniform temperature by a bath of a fused solid.

18. The process of making a reducing agent from petroleum oil which comprises passing the vapors of cracked kerosene mingled with air over an oxidizing catalyst under conditions to produce products containing reducing components, collecting the products of oxidation, and separating therefrom the reducing components thereof, whereby a reducing agent is obtained.

19. In a process of recovering valuable products from the oxidation of petroleum hydrocarbons by air at a temperature below a red heat wherein oxidation products in gaseous and vaporous condition are produced which are not removed from the products of oxidation by oil and water scrubbing, the step of passing such gases and vapors through silica gel in order to adsorb the products not readily removable by water and oil scrubbing.

20. An article of manufacture comprising a crystalline oxidation product of cracked petroleum.

21. In a process of oxidizing cracked petroleum vapors by air in the presence of a catalyst at a temperature below a red heat, the step of feeding the vapors and air to the reaction zone at a rate greater than that of the backward inflammation rate of the mixture of vapors and air.

22. A process of oxidizing cracked petroleum vapors which comprises passing such vapors in the presence of a gas containing oxygen at a temperature below a red heat over a catalyst comprising a metallic substance.

23. The process of oxidizing kerosene which comprises vaporizing this oil, passing it in admixture with heated air into contact with a porous catalytic mass heated to an oxidizing temperature and extracting crystalline water-soluble organic acids from the products of oxidation.

24. The process which comprises passing a mixture of petroleum hydrocarbon and air into contact with a catalyzer heated in a bath of molten metal at such a rate of speed that the exit gases are withdrawn at a lower temperature than that of the bath.

25. A process as set forth in claim 12 carried out under superatmospheric pressure.

26. An article of manufacture comprising a reducing agent containing a crystalline oxidation product of cracked petroleum.

CARLETON ELLIS.

DISCLAIMER 1,697,264.—*Carleton Ellis*, Montclair, N. J. MAKING ORGANIC ACIDS AND OTHER PRODUCTS FROM PETROLEUM. Patent dated January 1, 1929. Disclaimer filed November 25, 1935, by the assignee, *Ellis-Foster Company*.

Hereby enters this disclaimer to that part of the claim in said specification which is in the following words, to wit: Your Petitioner does hereby disclaim from claim 12 all processes of treating hydrcarbons except those in which the process is carried out under superatmospheric pressure as set forth in claim 25; and further does hereby disclaim from claims 13, 14, and 23 all processes of treating hydrocarbons except those in which the process is carried out under superatmospheric pressure.

[*Official Gazette December 31, 1935.*]